Dec. 26, 1933.  H. E. WACKER  1,940,895
INTERNAL COMBUSTION ENGINE
Filed July 1, 1931

Inventor
HERBERT E. WACKER
By
Attorney

Patented Dec. 26, 1933

1,940,895

UNITED STATES PATENT OFFICE 1,940,895

INTERNAL COMBUSTION ENGINE

Herbert E. Wacker, Detroit, Mich., assignor to Packard Motor Car Company, Detroit, Mich., a corporation of Michigan Application July 1, 1931. Serial No. 548,159

4 Claims. (Cl. 248—14.2)

This invention relates to aeroplanes and more particularly to means for mounting an engine upon an aeroplane frame.

Aeroplane engines have been mounted upon the forward end of an aeroplane frame in various ways, and where the engine is of the high speed, low cylinder pressure type no especial problems have been encountered. The tendency of the present day engine design is toward increased compression pressure, in the nature of the Diesel type, and the mounting becomes more important as it insulates the light aeroplane frame structure from shocks and vibrations resulting from the inherent characteristics of such engines.

An object of this invention is to provide means for mounting an engine of the high compression type upon the forward end of an aeroplane frame structure which forms a firm connection and yet has to a high degree the property of absorbing shock and vibration.

Another object of the invention is to provide a rubber connecting means between the rear end of an engine and the forward end of an aeroplane frame which forms substantially a rigid support for the engine.

A further object of the invention is to provide a mounting for supporting an engine of the high compression type in advance of an aeroplane frame, in which there are no contacting metallic parts.

Other objects of the invention will appear from the following description taken in connection with the drawing, which forms a part of this specification, and in which.

Figure 1:
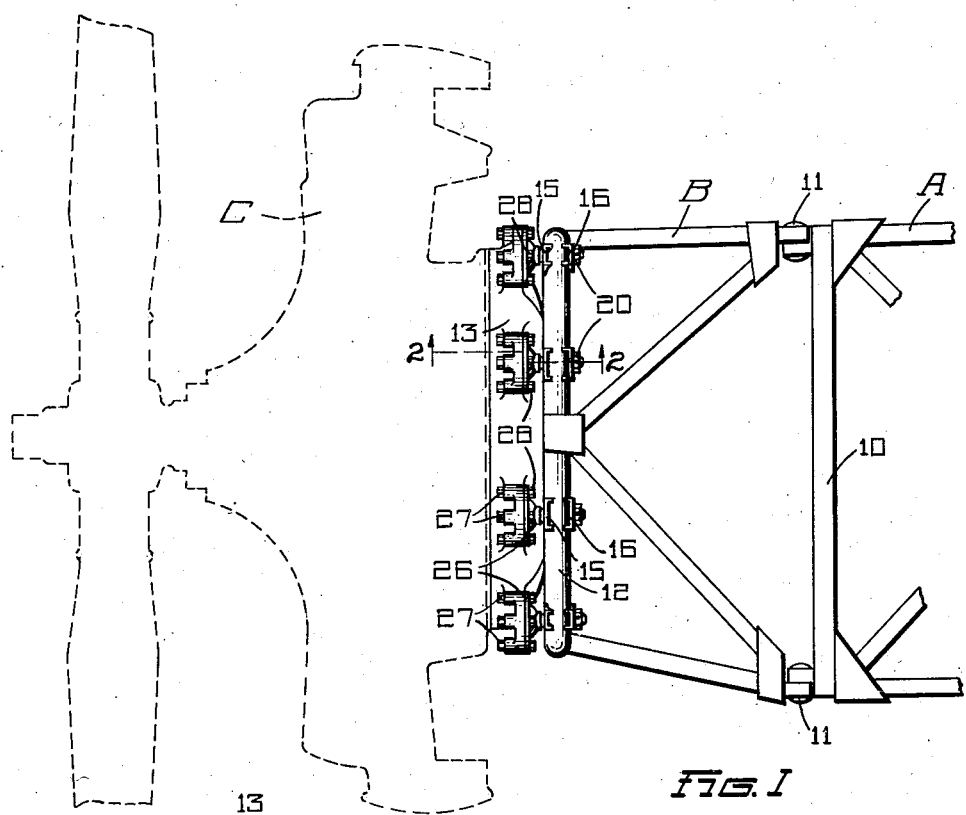
Fig. 1 is a side elevation of a portion of the forward end of an aeroplane frame, the engine being indicated in outline in advance of the frame, and the novel connecting means being clearly shown.
Figure 2:
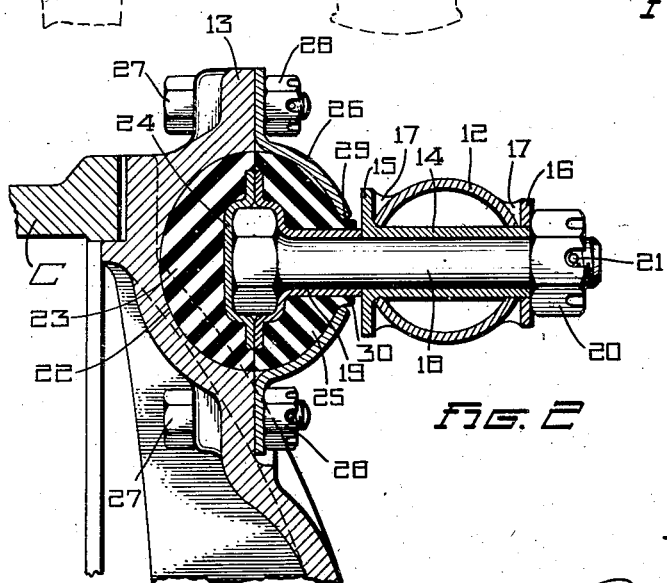
Fig. 2 is a sectional view taken on line 2—2 of Fig. 1.

The aeroplane frame is indicated generally at A, and for the purpose of the present invention it will not be necessary to describe the frame in any detail as it may be of a well known type or design. The forward fuselage end member or frame is indicated at 10, and secured to this member by suitable bolts 11 is the engine mount, or forward frame structure, generally indicated at B. The engine mount may also vary considerably in form of design, but in the present instance it terminates at the forward end in a transversely disposed ring member 12 formed of metallic tubing.

The engine, indicated generally at C, may be of any suitable type; however, the one illustrated is a nine-cylinder compression-ignition engine of the radial type, such, for example, as described in Patent No. 1,896,387, issued February 7, 1933 to Lionel M. Woolson. The engine frame terminates at the rear end in a cover plate 13 which is slightly larger in diameter than the ring 12.

Between the ring and the rear cover plate or wall of the engine, I provide a mounting or connection which supports the engine forwardly of the mount or forward frame and at the same time is substantially rigid and capable of absorbing substantially all engine shocks and vibrations. The ring is provided with a plurality of apertures through which bearings 14 extend, such bearings having a flange 15 extending from the forward end thereof and an encircling flange member 16 telescoping the end thereof which protrudes beyond the rear end of the ring. The flange and flange members are formed with webs or fillets 17 which are welded to the ring 12. Engine supporting means in the form of spaced bolts 18 extend through the bearings, and sleeve members 19 surround the shank portion of the bolts extending forwardly of the ring and, also, partially enclose the bolt heads. A nut 20 is screwed upon the rear end of each of the bolts, and such nuts are secured in adjusted positions by lock pins 21. The bearings 14 are locked against the rear end of the sleeve members 19 by the nuts 20 when the structure is assembled for use.

The rear wall, or cover plate of the engine is formed with a plurality of pockets or recesses 22 which are arranged to register with the bolts 18 extending through the ring member 12. Such pockets are preferably semi-spherical and are adapted to receive substantially semi-spherical rubber members 23. Arranged in the outer face of such blocks are caps 24 which are preferably formed complementary to the ends of the sleeves around the bolt heads and the rubber members 23 are preferably vulcanized to such cap members. Substantially semi-spherical rubber members 25 surround the sleeves 19 and are preferably vulcanized thereto. Suitable means, such as caps 26, fit over the rubber members 25 and secure them to the rear cover of the engine in complementary relation to the members 23. The caps 26 are formed with flanges which are fixed to the rear cover by bolts 27 and nuts 28, and it is obvious that with such securing means, the caps can be readily attached to or detached from the engine. Likewise, the ring can be readily detached from the bolts to permit removal thereof either when the bolts are attached or detached from the engine. If desired, the complementary members 23 and 25 could be formed as a single rubber structure and vulcanized to the members surrounding the forwardly extending ends of the bolts.

The caps 26 are provided with apertures 29, of larger diameter than that of the sleeves extending therethrough, and a neck 30 extends from the rubber members 25 to completely fill the apertures exteriorly of the sleeves 19. It is obvious that the engine will be supported entirely by members which are imbedded or enclosed by rubber. The rubber anchor means for the supporting bolts will prevent engine vibrations and shocks from being transmitted to the aeroplane frame, and the rubber is preferably of a medium hardness such that the engine will not have too much freedom of movement relative to the aeroplane frame.

The mounting, above described, is very effective, and adds very little, if any, weight to the aeroplane, while adding greatly to the comfort to the aeroplane operator and passengers and at the same time prolonging the life of the aeroplane by lessening the wear and tear thereon due to engine vibration.

Although the invention has been described in connection with a specific embodiment, the principles involved are susceptible to numerous other applications which will readily occur to persons skilled in the art. The invention is therefore to be limited only as indicated by the scope of the appended claims.

What I claim is:

1. In an aeroplane, a circular frame, an engine having one wall parallel with the frame and formed with pockets in alignment therewith, cap members secured to the engine wall in a relation enclosing the pockets therein, bolts extending through the frame and the caps, a two-part rubber mounting in each of the pockets, a cap member vulcanized in one of the parts of each rubber mounting and formed complementary to the bolt heads and a sleeve surrounding the head end of the bolt and vulcanized in the other part of each rubber mounting, said sleeve and cap of each rubber mounting being formed and related to enclose the end of the bolt extending through each of the caps enclosing the pocket.

2. A cushion connection comprising in combination, a wall having a pocket therein, a supporting member having an enlarged end in the pocket, a rigid casing surrounding the enlarged end of the supporting member in the pocket, rubber means in the pocket surrounding the rigid casing, and means secured to the wall and enclosing the pocket to retain the rubber therein.

3. A cushion connection comprising in combination, a wall having a pocket therein, a supporting member having an enlarged end in the pocket, a pair of flanged cap members surrounding the enlarged end of the supporting member and complementary in form relative thereto, the flanges of said cap members being in abutting relation, rubber means in the pocket surrounding the cap members, and means secured to the wall for retaining the rubber means in the pocket.

4. In an aeroplane, a frame, an engine having one wall parallel with the frame and formed with pockets in alignment therewith, means secured to the engine wall in a relation enclosing the pockets therein, bolts extending through the frame having the head ends thereof in the pockets, a rubber mounting in each of the pockets surrounding the head ends of the bolts, rigid sleeve elements around the head ends of the bolts and extending through the members enclosing the pockets, and means associated with the bolts for clamping the frame against the protruding ends of the sleeves.

HERBERT E. WACKER.